(12) United States Patent
Parthasarathy et al.

(10) Patent No.: US 7,124,408 B1
(45) Date of Patent: Oct. 17, 2006

(54) BINDING BY HASH

(75) Inventors: Srivatsan Parthasarathy, Issaquah, WA (US); Steven J. Pratschner, Redmond, WA (US); Craig T. Sinclair, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 281 days.

(21) Appl. No.: 09/604,987

(22) Filed: Jun. 28, 2000

(51) Int. Cl.
*G06F 9/44* (2006.01)
*H04L 9/00* (2006.01)

(52) U.S. Cl. ..................... 717/170; 713/167
(58) Field of Classification Search ........ 717/162–166; 713/187, 191, 193, 156, 176, 200, 167; 709/102, 709/106, 315, 316, 320, 332
See application file for complete search history.

(56) References Cited

U.S. PATENT DOCUMENTS

| | | | | |
|---|---|---|---|---|
| 5,390,247 A | * | 2/1995 | Fischer | 713/176 |
| 5,625,693 A | * | 4/1997 | Rohatgi et al. | 713/187 |
| 5,689,565 A | | 11/1997 | Spies et al. | 713/189 |
| 5,692,047 A | * | 11/1997 | McManis | 713/167 |
| 5,748,960 A | * | 5/1998 | Fischer | 719/316 |
| 5,802,368 A | * | 9/1998 | Grigsby et al. | 719/331 |
| 5,805,899 A | * | 9/1998 | Evans et al. | 717/170 |
| 5,842,214 A | | 11/1998 | Whitney et al. | 707/10 |
| 5,848,274 A | | 12/1998 | Hamby et al. | 717/153 |
| 5,892,904 A | | 4/1999 | Atkinson et al. | |
| 5,958,051 A | * | 9/1999 | Renaud et al. | 713/200 |
| 5,974,421 A | | 10/1999 | Krishnaswamy et al. | 707/103 R |
| 5,978,484 A | | 11/1999 | Apperson et al. | 705/54 |
| 5,991,399 A | * | 11/1999 | Graunke et al. | 380/279 |

(Continued)

FOREIGN PATENT DOCUMENTS

EP 0 845 733 A2 6/1998

(Continued)

OTHER PUBLICATIONS

International Search Report, PCT/US01/40632, Oct. 31, 2003.

*Primary Examiner*—Kakali Chaki
*Assistant Examiner*—Tuan Anh Vu
(74) *Attorney, Agent, or Firm*—Amin & Turocy, LLP (57) ABSTRACT

A system and method is provided for providing security to components or assemblies employed by application programs during runtime. Assemblies carry version information that can be used to enforce the versioning rules described by the application program. At runtime, version numbers requested by the application programs are compared with those version numbers of the assemblies that are actually found. In addition to comparing version numbers, the present invention offers a stricter form of version checking based on cryptographic hashes. An assembly is provided with module information that contains a list of the files that make up the assembly. Part of the information recorded about each module is a hash of the module's contents at the time the manifest was built. An assembly referencing another assembly computes the hash of the manifest of the referenced assembly. An assembly manifest may include dependency information, which is information about other assemblies that the assembly depends on or references. Part of the information stored as part of an assembly reference or manifest is a hash of the dependent assembly's manifest.

32 Claims, 7 Drawing Sheets

U.S. PATENT DOCUMENTS

| | | | |
|---|---|---|---|
| 6,021,491 A | 2/2000 | Renaud | 713/179 |
| 6,044,467 A | 3/2000 | Gong | 713/200 |
| 6,149,318 A * | 11/2000 | Chase et al. | 717/131 |
| 6,182,279 B1 * | 1/2001 | Buxton | 717/100 |
| 6,212,673 B1 * | 4/2001 | House et al. | 717/100 |
| 6,230,184 B1 * | 5/2001 | White et al. | 709/201 |
| 6,263,379 B1 * | 7/2001 | Atkinson et al. | 709/332 |
| 6,308,320 B1 * | 10/2001 | Burch | 717/154 |
| 6,324,637 B1 * | 11/2001 | Hamilton | 711/216 |
| 6,374,266 B1 * | 4/2002 | Shnelvar | 707/204 |
| 6,445,973 B1 * | 9/2002 | Sagasaki et al. | 700/180 |
| 6,463,535 B1 * | 10/2002 | Drews | 713/176 |
| 6,480,880 B1 * | 11/2002 | White et al. | 709/201 |
| 6,510,516 B1 * | 1/2003 | Benson et al. | 713/167 |
| 6,748,538 B1 * | 6/2004 | Chan et al. | 726/26 |
| 2002/0026634 A1 * | 2/2002 | Shaw | 717/173 |
| 2002/0129094 A1 * | 9/2002 | Reisman | 709/203 |

FOREIGN PATENT DOCUMENTS

WO     WO 99/36854     7/1999

* cited by examiner

BINDING BY HASH

TECHNICAL FIELD

The present invention relates to computer systems, and more particularly to a system and method for ensuring the integrity of components employed by application programs at runtime.

BACKGROUND OF THE INVENTION

In the past, application programs consisted of a single monolithic binary file. Once a compiler generated the application program, the application program did not change until a next version was recompiled and shipped. Changes in an operating system, hardware and market demands were dependent on waiting for the next version to be implemented and recompiled. Today, application programs are comprised of several components—additionally, many of these components are linked at runtime. These components include dynamically linked libraries (DLLs) and other files that are shared by different application programs. These DLLs are listed within tables in application components to be linked at runtime. An operating system will search in a loader search path, application directory, operating system directory or user specified path for the name of the dynamic linked library, so that DLL code can be loaded into memory for execution. Since these DLLs can be shared by different application programs, changes to a DLL for one application may cause another application to stop operating.

Furthermore, many application programs running on operating systems, such as Microsoft® Windows® Operating System employ shared operating system components. One of the primary issues faced by administrators and developers on the current Microsoft® Windows@ Operating System platform is the inability to control an exact set of dynamic link libraries and other files that will run as part of a deployed application program. It is quite common to have installation of one application program affect other application programs by overwriting files that those applications depend on. Unfortunately, there is no built in support in Microsoft® Windows® Operating System to detect when a file that an application depends on has changed.

Presently, there has not been a way of tracking assemblies used to build and test application programs. In the past, components may be changed and the application program may still run if the changes do not effect the functionality of the application program. For example, if a publisher of a component corrects a minor error in a component, the application program may still operate without a problem. Also, if a version upgrade has occurred by a publisher, the application program may execute the component without a problem, if the component is backwards compatable. However, there is no way of protecting application programs from versioning upgrades by a publisher of components, if the publisher was wrong about the new version being backwards compatible with the previous components. Furthermore, if the component has been altered by an untrusted third party, execution of the code can result in damage to the software and hardware of the environment that the application program is operating on. Some codes include versioning information in the name of the component (e.g., foo1.dll, kernel2.dll). Since application programs reference these components by name, a change in the name will cause the application program to terminate its operation or use an old version of the component residing on the system.

Accordingly, there is an unmet need in the art for a method for ensuring and verifying integrity of components employed by application programs during runtime. There is also a need for a tool for verifying integrity of components at runtime.

SUMMARY OF THE INVENTION

The present invention relates to a system and method of providing security and facilitating the integrity of components or assemblies (e.g., components including metadata), employed during runtime by application programs. The present invention employs cryptographic techniques to facilitate relationship between components. Administrators and developers can utilize this system and method to facilitate that an exact set of dynamic link libraries (DLLs) and other files that have been tested together can in fact run together after they are deployed. Assemblies carry version information that can be used to enforce the versioning rules described by the application program. At runtime, version numbers requested by the application programs are compared with those version numbers of the assemblies that are actually found. In addition to comparing version numbers, the present invention offers a stricter form of version checking based on cryptographic hashes.

Each assembly can be provided with a manifest that contains a list of files or modules that make up the assembly. Part of the information recorded about each file is a hash of the file's contents at the time the manifest was built. The hash is computed over the entire contents of the file. The code that emits the manifest is typically a compiler or a post-link tool, which is may be responsible for computing the hash. The present invention may employ a variety of hash algorithms, such as secured hash algorithm (sha-1), MD5, or any other cryptographically acceptable hash algorithm in computing the hash. In one aspect of the invention, the creator of the manifest can specify which hash algorithm that the creator would like employed. The file hashes can be verified when an assembly is installed into a global assembly cache and each time a file is loaded from a disk.

The file hashes described above facilitate integrity of the deployable unit (e.g., the assembly). However, most applications are comprised of several assemblies. Therefore, to ensure integrity of the entire application it is necessary to confirm not only that each individual assembly has not changed, but that the set of assemblies used by the application program at runtime are the same set that were previously built and tested together. In one aspect of the invention, an assembly referencing another assembly computes the hash of the manifest of the referenced assembly. An assembly manifest can include dependency information, which is information about other assemblies that the assembly depends on or references. Part of the information stored as part of the dependency information is a hash of the referenced assembly's manifest. Hashing the manifest of the referenced assembly is sufficient because that manifest in turn includes hashes of all its constituent files. As with the file hashes, hashes on manifests of referenced assemblies can be computed by the tool emitting the manifest.

According to one aspect of the invention, a method is provided for facilitating integrity of an assembly employable by application programs during runtime. An assembly is provided with a manifest that contains a list of modules that make up the assembly and the manifest is provided with a hash of the contents of at least one module of the list of modules.

Another aspect of the invention relates to a method for facilitating the integrity of assemblies employable by application programs at runtime. An assembly is provided with a manifest that contains a list of referenced assemblies that the assembly depends on and the manifest is provided with a hash of a manifest of at least one referenced assembly of the list of referenced assemblies.

In yet another aspect of the invention, a computer readable medium is provided having at least one computer executable component employable by an application program at runtime. The computer readable medium comprises an assembly having a manifest that contains a list of modules that make up the assembly and a hash of the contents of at least one module of the list of modules.

Another aspect of the invention relates to a computer readable medium having at least one computer executable component employable by an application program at runtime. The computer readable medium comprises an assembly having a manifest that contains a list of at least one referenced assembly that the assembly depends on and a hash of the contents of a manifest of the at least one referenced assembly.

In accordance with another aspect of the invention, a system is provided for facilitating integrity of assemblies employable by application programs during runtime. The system comprises a first component adapted to provide a manifest for an assembly. The manifest has a list of modules making up the assembly. The system also includes a second component adapted to provide the manifest with a hash of at least one module of the list of modules.

In an alternate aspect of the invention, a system is provided for facilitating integrity of assemblies employable by application programs during runtime. The system comprises a first component adapted to provide a manifest for an assembly. The manifest includes at least one referenced assembly. The system also includes a second component adapted to provide the manifest with a hash of a manifest of the at least one referenced assembly.

Another aspect of the invention relates to a system for facilitating integrity of an assembly employable by application programs during runtime. The system comprises means for relating a manifest having a list of related assemblies to an assembly and means for providing the manifest with a hash of one of a manifest or the at least one of the related assemblies.

To the accomplishment of the foregoing and related ends, the invention then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed and the present invention is intended to include all such embodiments and their equivalents. Other objects, advantages and novel features of the invention will become apparent from the following detailed description of the invention when considered in conjunction with the drawings.

DETAILED DESCRIPTION OF THE INVENTION

The present invention is now described with reference to the drawings, wherein like reference numerals are used to refer to like elements throughout. The present invention is described with reference to a system and method for facilitating integrity of components employed by application programs during runtime. These components are typically dynamically linked libraries (DLLs), but also could include definition files, declaration files and executable files linked to an application program at runtime. An assembly according to at least one aspect of the subject invention is herein defined as components that include metadata defining the assembly, describing components that make up the assembly and describing the assemblies that an assembly depends on. The present invention employs cryptographic techniques, such as hashing, to ensure the integrity of assemblies used by application programs. Additionally, the present invention allows for reduction of large DLL files to be divided into several smaller files while ensuring DLL integrity.

Figure 1:
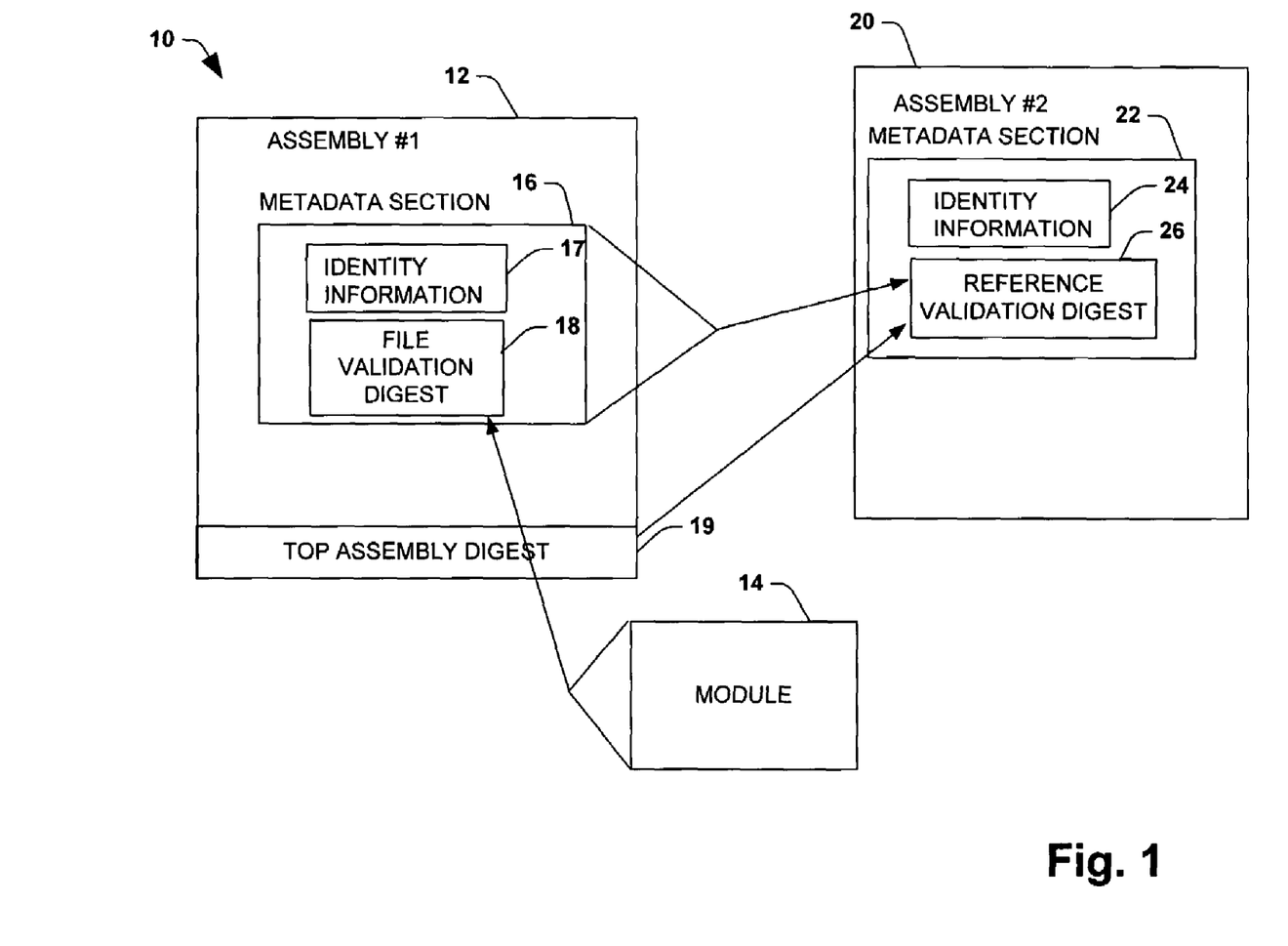
FIG. 1 illustrates a block diagram of an assembly referencing an assembly having multiple modules in accordance with one aspect of the present invention.

FIG. 1 illustrates relationships of assemblies according to the present invention. A first assembly 10 includes a top assembly 12 (e.g., a file with a metadata section or manifest) and a module or subassembly 14. The assembly 10 can include a top assembly and any number of modules that make up the assembly 10. The top assembly is defined as an assembly that includes a metadata section or manifest. The metadata section or manifest can include identity information defining the assembly, assembly references that define the dependencies to other assemblies and module references that define a link to modules or subassemblies. A metadata section 16 is provided in the top assembly 12 that includes information regarding the first assembly 10. The metadata section 16 includes an identity information component 17 and a file validation digest component 18. The identity information component 17 includes information about the first assembly 10, while the file validation digest component 18 includes information about the module 14. The identity information component 17 can include such information as a simple name, version information, operating system or processor information, publisher information, in addition to many other types of information about the first assembly 10. The file validation digest component 18 may include a hash of the module 14.

The information in the identity information component 17 is accessible to others, while the information in the file validation digest component 18 is not accessible to others, but can be used prior to runtime or at runtime to verify that the assembly has not been modified. A top assembly digest 19 may be provided at the end of the top assembly 12. The top assembly digest 19 may contain a hash of the contents of the top assembly 12. The top assembly hash can be used to verify that the contents of the top assembly 12 have not been modified, while the hash in the file validation digest component 18 can be used to verify that the module 14 has not been modified.

It is to be appreciated that most application programs are comprised of several assemblies, some of which refer to other assemblies while executing. Therefore, FIG. 1 also illustrates a second assembly 20 being provided that depends on the first assembly 10. A metadata section 22 is provided in the second assembly 20 that includes information regarding the second assembly 20 and also information about the first assembly 10, which it references during runtime. The metadata section 22 includes an identity information component 24 and a reference validation digest component 26. The identity information component 24 includes information about the second assembly 24, while the reference validation digest component 26 includes information about the first assembly 10. The identity information component 24 can include such information as a simple name, version information, operating system or processor information, publisher information, in addition to many other types of information about the second assembly 20. The reference validation digest component 26 may include a hash of the metadata section 16 of the top assembly 12 of the first assembly 10.

The information in the identity information component 24 is accessible to others, while the information in the file validation digest component 26 is not accessible to others, but can be used prior to runtime or at runtime to verify that the first assembly 10 and the second assembly 20 have not been modified. Since the metadata section 16 includes the hash of the module 14, there is no need to provide a hash in the metadata section 22 of the second assembly 20 to verify that the module 14 has not been modified. The reference validation digest 26 can optionally include a hash value of the top assembly 12. However, this is not necessary because the top assembly hash in the top assembly digest 19 can be compared with an actual hash value of the top assembly 12 determined before or at runtime.

Figure 2:
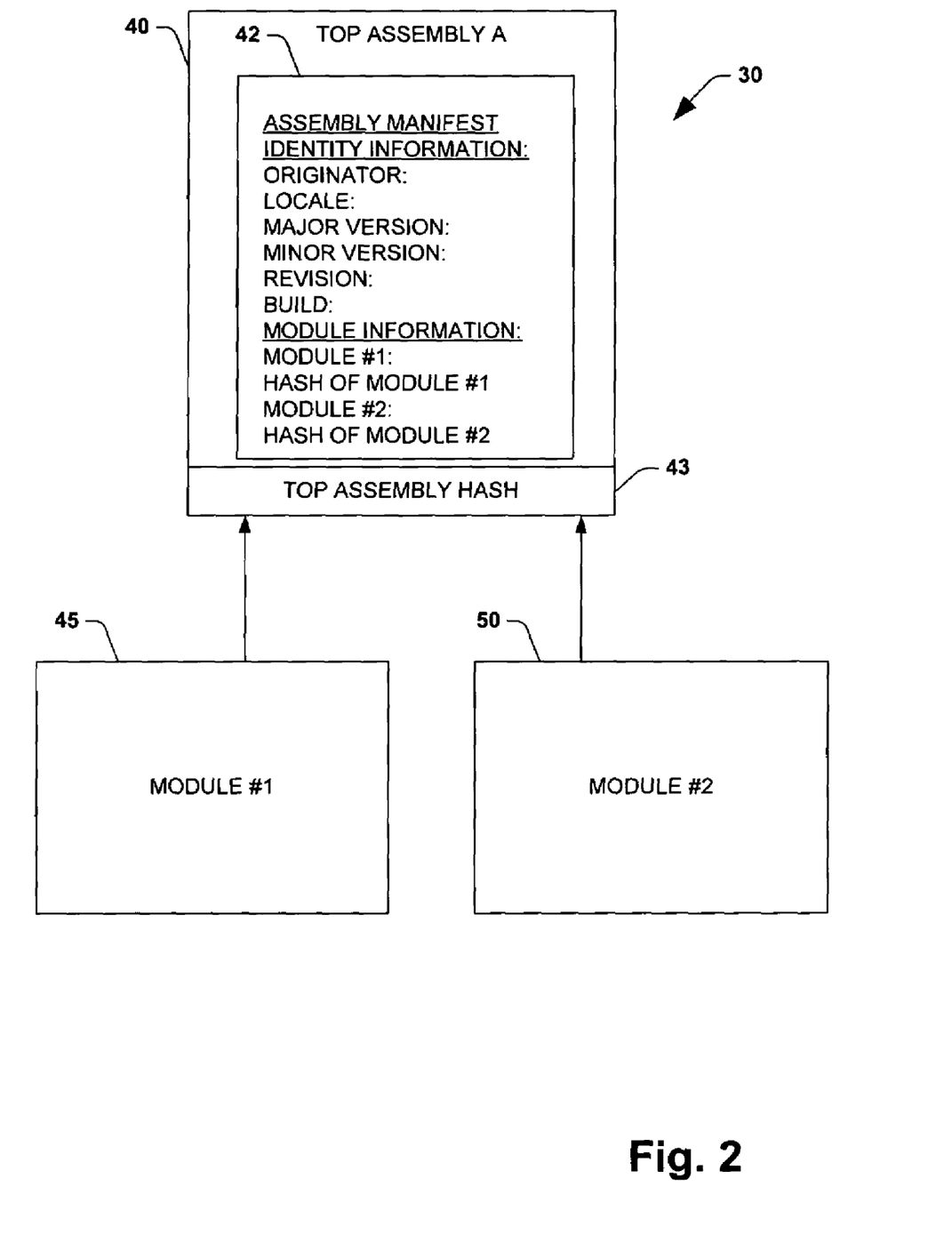
FIG. 2 illustrates a detailed block diagram of an assembly having multiple modules in accordance with one aspect of the present invention.

FIG. 2 illustrates the composition of an assembly in more detail according to the present invention. An assembly 30 is comprised of a top assembly 40, a first module 45 and a second module 50. The top assembly 40 includes a metadata section 42 referred to as an assembly manifest. The assembly manifest 42 includes identity information having the following information: originator name, locale, major version, minor version, revision, build and module information. Other information can be placed in the identity manifest (e.g., operating system). The module information is a list of the modules making up the assembly 30 and the hash of the file contents of each module. Prior to or at runtime, the module hashes in the assembly manifest 42 can be checked against the actual hashes of the first module 45 and the second module 50, using the same hash algorithm, to determine the integrity of the assembly 30. Optionally, the top assembly 40 include a top assembly hash 43 located at the end of the file. The top assembly hash can be utilized to determine if any changes have occurred in the top assembly 40. If the assembly 30 has changed, the application program calling the assembly 30 can choose to abort. In an alternate aspect of the invention, the application program may choose to review the identity information to determine if the change has been invoked by a trustworthy source. The application program can then choose to abort or allow execution of the assembly 30.

Figure 3:
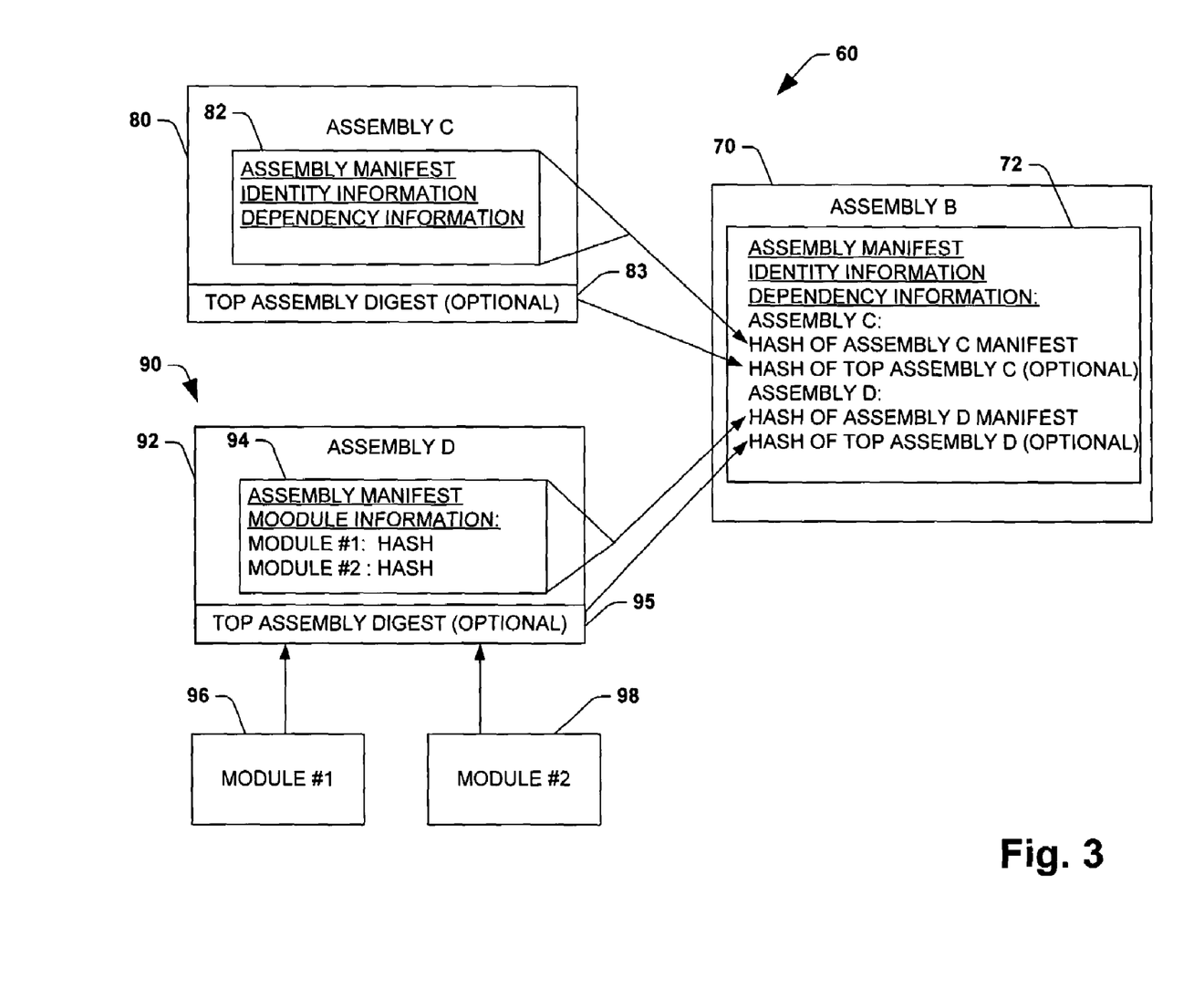
FIG. 3 illustrates a detailed block diagram of an assembly referencing multiple assemblies in accordance with one aspect of the present invention.

FIG. 3 illustrates the composition of an assembly that references another assembly in more detail according to the present invention. A referencing assembly 70, labeled assembly B, references a first referenced assembly 80, labeled assembly C, and a second referenced assembly 90, labeled as assembly D. The referencing assembly 70 includes an assembly manifest 72 having module information similar to the module information of top assembly 40 described in FIG. 2. The assembly manifest 72 also includes dependency information such as a list of assemblies that the referencing assembly 70 depends on during execution. The dependency information also includes a hash of the top assembly manifest of each referenced assembly. Optionally, the dependency information includes a hash of the top assembly. The first referenced assembly 80 has an assembly manifest 82 including both identity information and dependency information, and an optional top assembly digest 83. The presence of dependency information informs the application program that the first referenced assembly 80 also depends on at least one other assembly. The first referenced assembly 80 does not have any modules and therefore there is not any module information or hashes for any modules. The second referenced assembly 90 has an assembly manifest 94 that includes module information, but not any dependency information. Therefore, since the second referenced assembly 90 does not have any dependency information it does not depend on any other assemblies to execute. An optional top assembly digest 95 is also provided at the end of the second referenced assembly 90. The second referenced assembly 90 is comprised of a top assembly 92, a first module 96 and a second module 98. The module information includes a list of the modules of the assembly 90 and the hash of the entire contents of each module. The entire contents of assemblies 70, 80 and 90 can be loaded into a cache of a computer system at runtime and the hashes verified with the hashes stored in the manifests at or prior to runtime.

Figure 4:
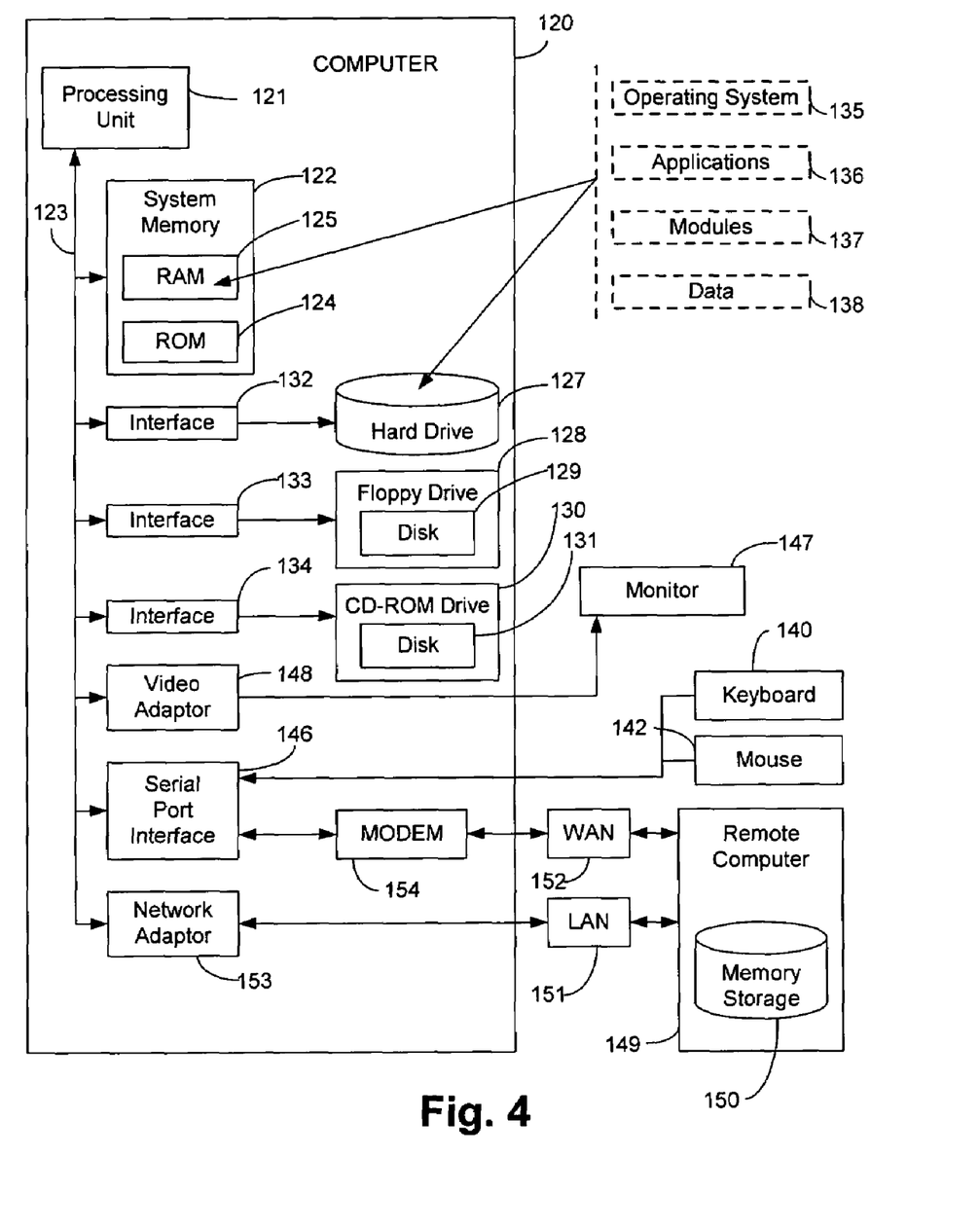
FIG. 4 illustrates a block diagram of a computer system in accordance with an environment of the present invention.

FIG. 4 and the following discussion are intended to provide a brief, general description of a suitable computing environment in which the invention may be implemented. While the invention will be described in the general context of computer-executable instructions of a computer program that runs on a personal or server computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including single- or multiprocessor computer systems, minicomputers, mainframe computers, hand-held computing devices, microprocessor-based or programmable consumer electronics, and the like. The illustrated embodiment of the invention also is practiced in distributed computing environments where tasks are performed by remote processing devices that are linked through a communications network. But, some embodiments of the invention can be practiced on stand-alone computers. In a distributed computing environment, program modules may be located in both local and remote memory storage devices.

With reference to FIG. 4, an exemplary system for implementing the invention includes a conventional personal or server computer 120, including a processing unit 121, a system memory 122, and a system bus 123 that couples various system components including the system memory to the processing unit 121. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 121.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 124 and random access memory (RAM) 125. A basic input/output system (BIOS), containing the basic routines that help to transfer information between elements within the computer 120, such as during start-up, is stored in ROM 124.

The computer 120 further includes a hard disk drive 127, a magnetic disk drive 128, e.g., to read from or write to a removable disk 129, and an optical disk drive 130, e.g., for reading a CD-ROM disk 131 or to read from or write to other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage of data, data structures, computer-executable instructions, etc. for the server computer 120. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 125, including an operating system 135, one or more application programs 136, other program modules 137, and program data 138. The operating system 135 in the illustrated computer can be Microsoft Windows NT Server operating system, together with the before mentioned Microsoft Transaction Server, Microsoft Windows 95, Microsoft Windows 98 or Microsoft Windows 2000.

A user may enter commands and information into the computer 120 through a keyboard 140 and pointing device, such as a mouse 142. Other input devices (not shown) may include a microphone, joystick, game pad, satellite dish, scanner, or the like. These and other input devices are often connected to the processing unit 121 through a serial port interface 146 that is coupled to the system bus, but may be connected by other interfaces, such as a parallel port, game port or a universal serial bus (USB). A monitor 147 or other type of display device is also connected to the system bus 123 via an interface, such as a video adapter 148. In addition to the monitor, computers typically include other peripheral output devices (not shown), such as speakers and printers.

The computer 120 may operate in a networked environment using logical connections to one or more remote computers, such as a remote server or client computer 149. The remote computer 149 may be a workstation, a server computer, a router, a peer device or other common network node, and typically includes many or all of the elements described relative to the computer 120, although only a memory storage device 150 has been illustrated in FIG. 4. The logical connections depicted in FIG. 4 include a local area network (LAN) 151 and a wide area network (WAN) 152. Such networking environments are commonplace in offices, enterprise-wide computer networks, intranets and the Internet.

When used in a LAN networking environment, the computer 120 is connected to the local network 151 through a network interface or adapter 153. When used in a WAN networking environment, the server computer 120 typically includes a modem 154, or is connected to a communications server on the LAN, or has other means for establishing communications over the wide area network 152, such as the Internet. The modem 154, which may be internal or external, is connected to the system bus 123 via the serial port interface 146. In a networked environment, program modules depicted relative to the computer 320, or portions thereof, may be stored in the remote memory storage device. It will be appreciated that the network connections shown are exemplary and other means of establishing a communications link between the computers may be used.

In accordance with practices of persons skilled in the art of computer programming, the present invention is described below with reference to acts and symbolic representations of operations that are performed by the computer 120, unless indicated otherwise. Such acts and operations are sometimes referred to as being computer-executed. It will be appreciated that the acts and symbolically represented operations include the manipulation by the processing unit 121 of electrical signals representing data bits which causes a resulting transformation or reduction of the electrical signal representation, and the maintenance of data bits at memory locations in the memory system (including the system memory 122, hard drive 127, floppy disks 129, and CD-ROM 131) to thereby reconfigure or otherwise alter the computer system's operation, as well as other processing of signals. The memory locations where data bits are maintained are physical locations that have particular electrical, magnetic, or optical properties corresponding to the data bits.

Figure 5:
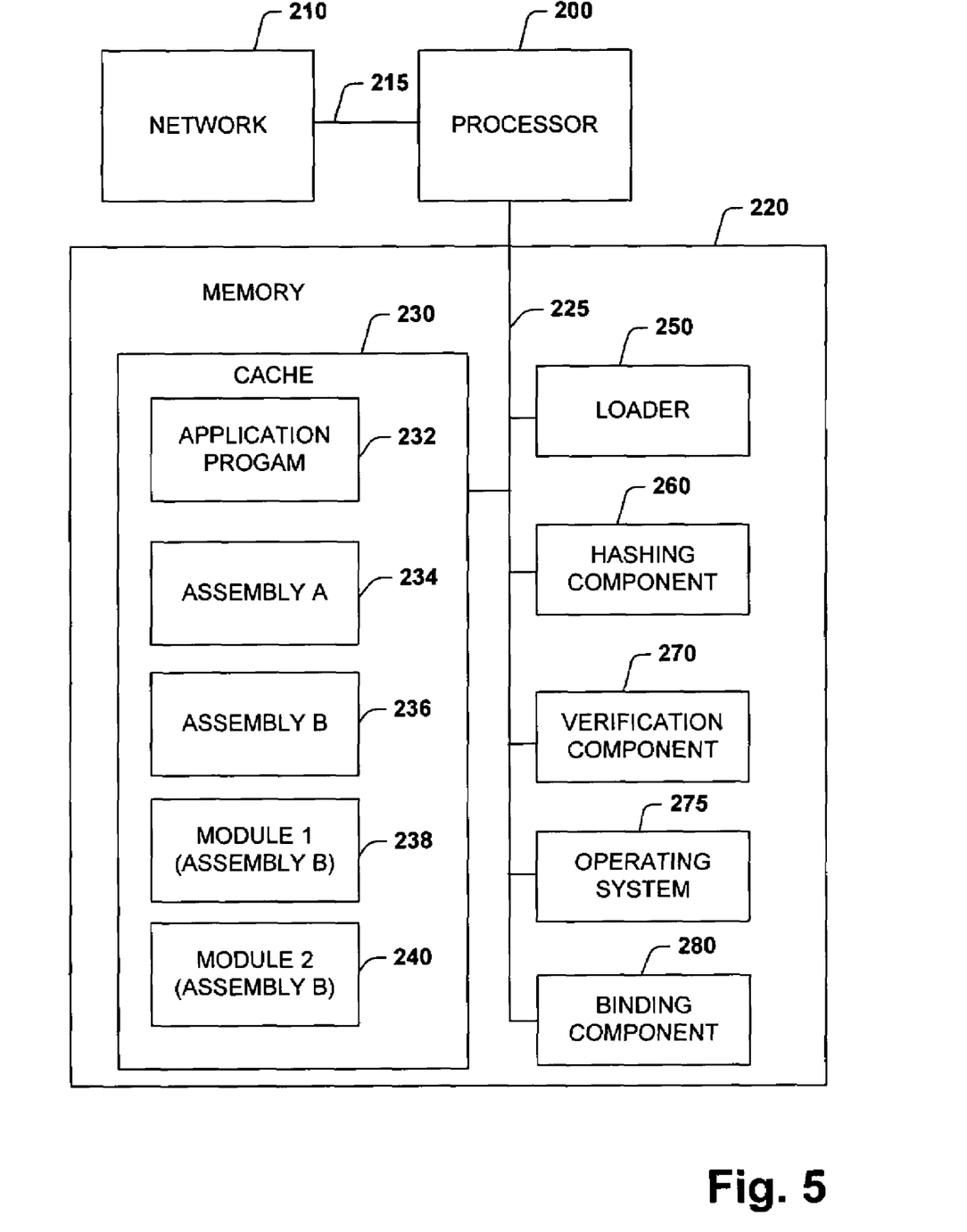
FIG. 5 illustrates a detailed block diagram of an environment in accordance with the present invention.

FIG. 5 illustrates a more detailed environment with respect to the present invention. A processor 200 is coupled to a memory medium 220 through a bus 225. The processor is also coupled to a network 210 through a network line 215. The network 210 allows for the processor to retrieve and send assemblies and other components with other remote computers. The memory medium 220 includes a cache memory 230 separate from the remaining portions of the memory. The cache memory 230 is where the application program 232 executes. It is to be appreciated that the remaining memory can be a secondary cache, ROM, RAM, or some fixed or floppy disk medium. A hashing component 260 resides on the memory medium 220 for inserting version information and hashes of assemblies during the development stage of the assemblies. However, the hashing component 260 could insert the hashes during an initial deployment and testing of the application programs and assemblies or by an administrator at a later time. The hashing component 260 can be an application program interface (API) that resides as part of an operating system 275. However, the hashing component 260 can be part of the application program 232. Furthermore, the hashing component 260 may be comprised of a number of different components, for example, separate components for the hash and versioning functions.

The application program 232 is deployed and loaded into the cache 230 (e.g., an in-memory cache that remembers all assemblies that have been loaded). The application program 232 communicates to a loader 250, which locates the assemblies specified by the application program 232 to be used by the application program 232 at runtime and loads these assemblies into the cache 230. In the present example, a first assembly 234, labeled assembly A, and a second assembly 236, labeled assembly B, are loaded into the cache 230. The second assembly 236 includes a first module 238 and a second module 240 that are also loaded into the cache 230. The first assembly 234 and the second assembly 236 may reside as shared assemblies that are part of the operating system 275, may reside as libraries on a remote computer, may reside in a directory as part of the application program 232 or within another application program.

A binding component 280 also resides in the memory medium 220. The binding component 280 provides a binding policy and is used to manage the applications that deal with shared assemblies. The binding component 280 can make decision of whether to bind to an original, upgraded or standardized version of assemblies. For, example, the first assembly 234 and the second assembly 236 can have the same assembly name where the second assembly 236 is an updated version of the first assembly 234. Furthermore, both assemblies may be loaded into the cache 230 by the loader 250. The binding component 280 can then determine whether or not the application program 232 should bind to the first assembly 234 or the second assembly 236 based on a binding policy defined in the binding component 280. The binding component 280 allows for assemblies with the same name to reside side by side within a system and allows the application program 232, a developer or an administrator the ability to control the decision making on what is the appropriate binding policy.

A verification component 270 resides on memory medium 220. The verification component is invoked to read the manifests within the assemblies and call the hash algorithm used to hash the assemblies and the manifests of the assemblies. The verification component 270 then compares the hashes within the manifests with actual hashes obtained by running hashes on the assemblies. The verification component 270 can then communicate to the application program 232 whether or not any changes have occurred with the assemblies. The verification component 270 can then decide whether or not to abort. In an alternate aspect of the invention, the verification component 270 can check version and publisher information based on the binding policy set by the binding component 280. These version and publisher information can be used to determine if the application program should execute the assemblies even if changes were found based on the hash verification. In yet another alternate aspect of the invention, the verification component retains a table of hashes of the assemblies employed during initial deployment and testing of the application program. The verification component can then run hashes on the assemblies and compare the hashes with the hashes found in the tables. The verifying component 270 can be an application program interface (API) that resides as part of an operating system 275 or can be part of the application program 232.

It is to be appreciated that the above example of components were depicted as being separate for illustrative purposes only. It is to be understood that various components can be integrated within other components while still maintaining the functionality described above. Furthermore, the above description is an example of how the components can interact to carry out the present invention and other examples may be employed to carry out the present invention.

Figure 6:
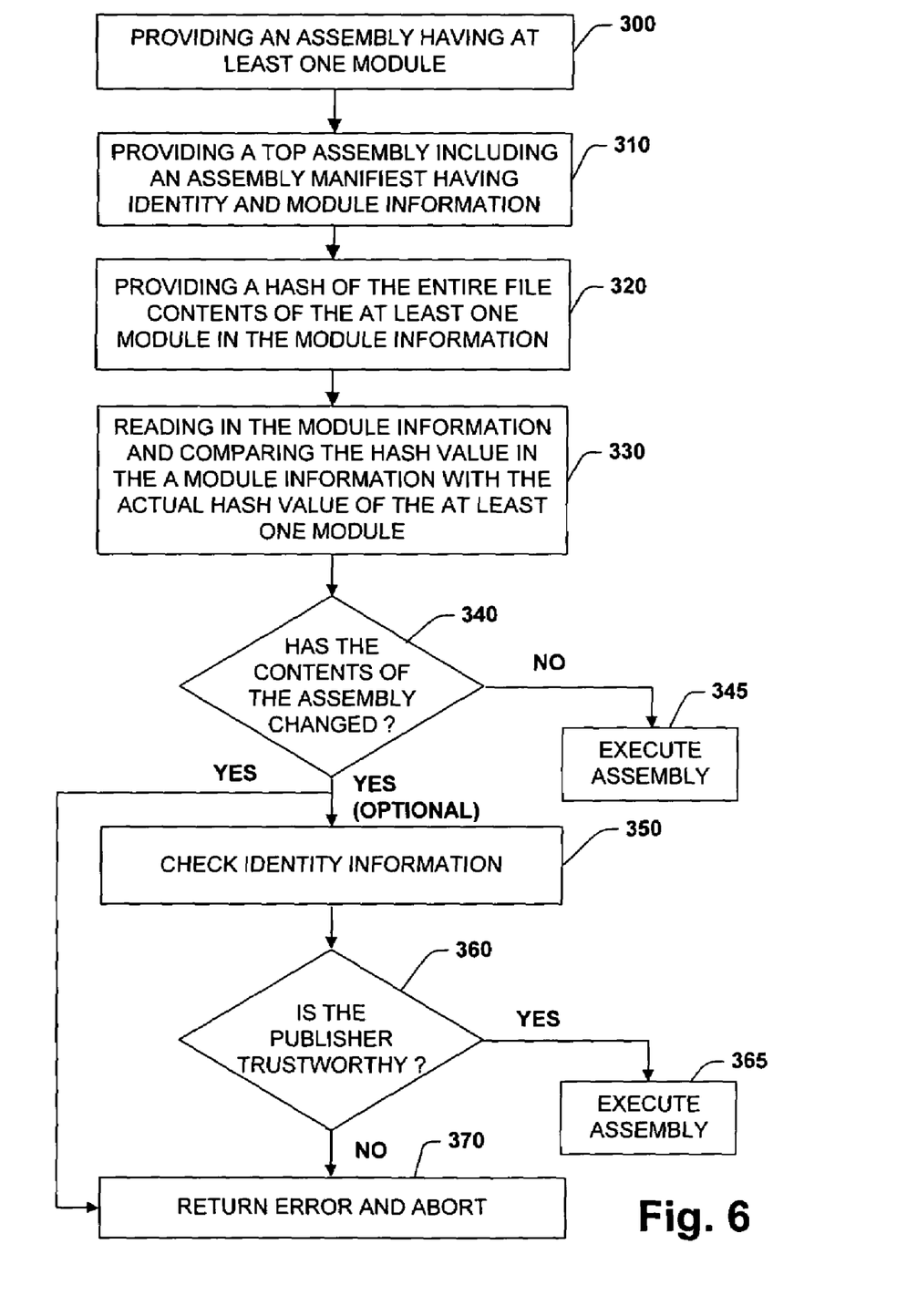
FIG. 6 illustrates a flow diagram of one particular methodology for facilitating the integrity of an assembly in accordance with one aspect of the present invention.

FIG. 6 illustrates one particular methodology for ensuring and verifying the integrity of an assembly having modules. In step 300, an assembly is provided having at least one module. In step 310, a top assembly of the assembly is provided having an assembly manifest with identity information and module information. A hash of the entire file contents of at least one module is provided in the module information by invoking the hashing component 260 in step 320. The application program 232 and the assemblies employed by the application program can now be loaded into the cache 230 for execution. In step 330, the hash value of the at least one module in the module information is compared with actual hash value of the at least one module. In step 340, a determination of whether the contents of the assembly have changed is made. If the assembly has not changed (NO), the assembly is executed in step 345. If the assembly has changed (YES), typically an error would be returned and the application program would abort. An optional step of checking the identity information is provided in step 350 based on a particular binding policy defined in the binding component 280. In step 360, a determination of whether the modification was done by a trustworthy publisher is made by the verification component 275. If the publisher is trustworthy (YES), the assembly is executed in step 365. If the publisher is not trustworthy (NO), the application program 232 is returned an error and then aborts in step 370.

Figure 7:
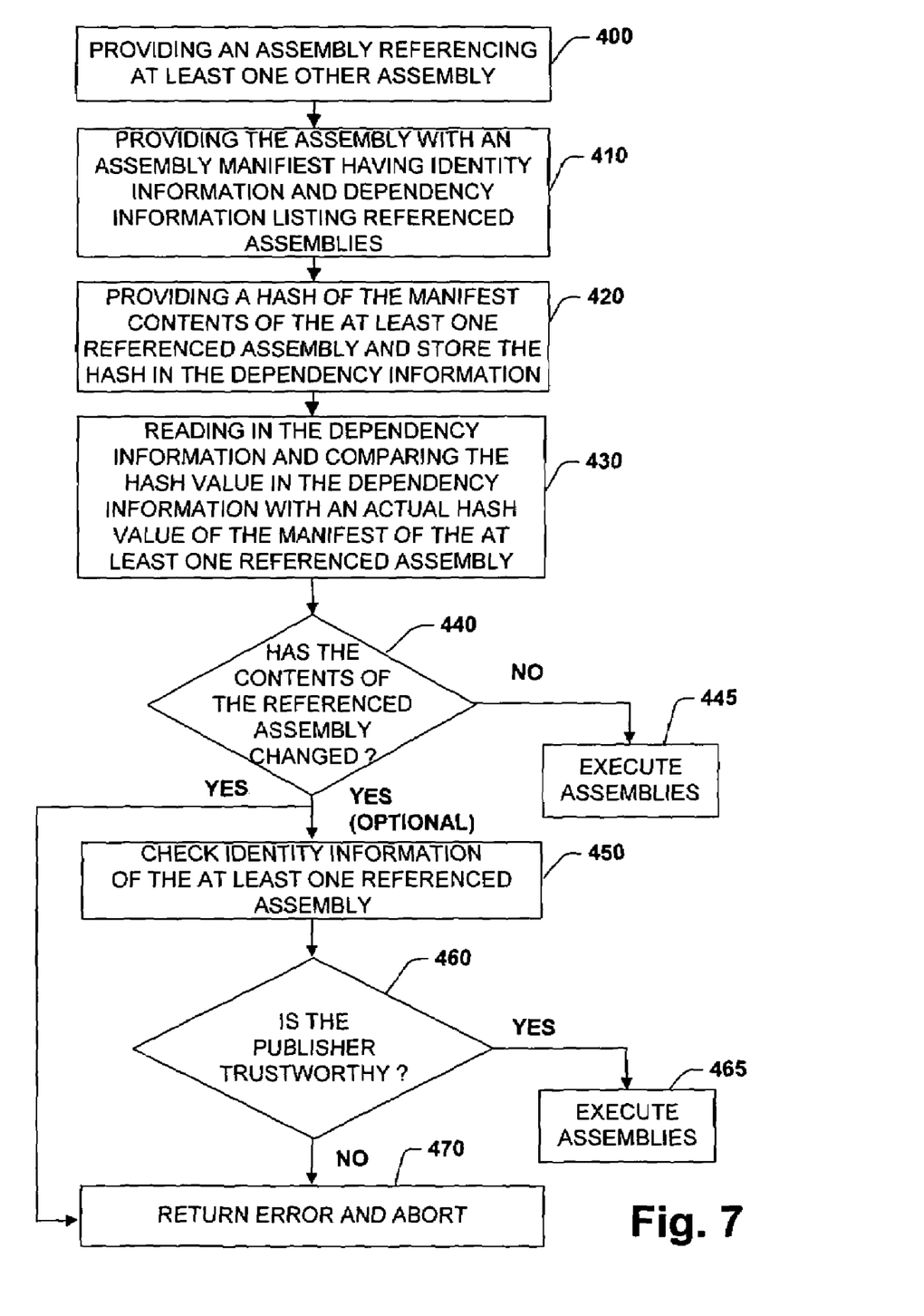
FIG. 7 illustrates a flow diagram of another methodology for facilitating the integrity of an assembly in accordance with one aspect of the present invention.

FIG. 7 illustrates one particular methodology for ensuring and verifying the integrity of assemblies referenced by other assemblies. In step 400, an assembly is provided that references at least one other assembly. In step 410, the assembly is provided with an assembly manifest having identity information and dependency information. The dependency information includes a listing of at least one referenced assembly. A hash of the manifests of the at least one referenced assembly is provided as part of the dependency information by invoking the hashing component 260, in step 420. The application program 232 and the assemblies employed by the application program can now be loaded into the cache 230 by the loader 250 for execution. In step 430, the hash value of the at least one referenced assembly in the dependency information is compared with actual hash values of the manifests of the at least one referenced assembly by employing the verification component 270. In step 440, a determination of whether the contents of any referenced assembly has changed is made. If none of the referenced assemblies have changed (NO), the referenced assemblies are executed in step 445. If any of the referenced assemblies have changed (YES), typically an error would be returned and the application program would abort. An optional step of checking the identity information is provided in step 450 based on a particular binding policy defined in the binding component 280. In step 460, a determination of whether the modification was done by a trustworthy publisher is made. If the publisher is trustworthy (YES), the referenced assemblies are executed in step 465. If the publisher is not trustworthy (NO), the application program is returned an error and then aborts in step 470.

The present invention has been illustrated with respect to a programming methodology and/or computer architecture and a particular example, however, it is to be appreciated that various programming methodology and/or computer architecture suitable for carrying out the present invention may be employed and are intended to fall within the scope of the hereto appended claims.

The invention has been described with reference to the preferred aspects of the invention. Obviously, modifications and alterations will occur to others upon reading and understanding the foregone detailed description. It is intended that the invention be construed as including all such modifications alterations, and equivalents thereof.

What is claimed is:

1. A method for facilitating integrity of an assembly employable by application programs during runtime, comprising:
   providing an assembly with an assembly manifest that contains a list of modules that make up the assembly;
   providing the assembly manifest with a hash of the contents of at least one module of the list of modules;
   providing the assembly manifest with a hash of a manifest of at least one other assembly that the assembly depends on; and
   comparing the hash retained in the assembly manifest with a hash of the at least one module obtained at runtime to identify whether a runtime version of the at least one module is substantially similar to a version utilized at build time of the assembly and utilizing said identification to evaluate the integrity of the assembly.

2. The method of claim 1, providing the assembly manifest with the hash of the contents of at least one module of the list of modules comprises providing the assembly manifest with a hash of each module of the list of modules that constitutes the assembly.

3. The method of claim 1, further comprising providing identity information in the assembly manifest.

4. The method of claim 3, the identity information comprising publisher information and version information.

5. The method of claim 1, further comprising providing a hash of the contents of the assembly at the end of the assembly.

6. The method of claim 1, further comprising determining if the contents of the assembly have been modified by determining an actual hash of the contents of the at least one module of the list of modules and comparing the actual hash with the hash of the contents of the at least one module of the list of modules residing in the assembly manifest.

7. The method of claim 6, further comprising determining if the publisher of the assembly is trustworthy if the assembly has been modified.

8. The method of claim 7, determining if the publisher of the assembly is trustworthy if the assembly has been modified comprises checking version information and publisher name information residing in the assembly manifest.

9. A method for facilitating integrity of assemblies employable by application programs during runtime, comprising:
   providing an assembly with an assembly manifest that contains a list of referenced assemblies that the assembly depends on;
   providing the assembly manifest with a hash of a manifest of at least one referenced assembly of the list of referenced assemblies; and
   analyzing the hash provided to the assembly manifest and a second hash of the manifest of the at least one referenced assembly computed at runtime to determine whether changes have been made to the at least one referenced assembly between runtime and at build time of the assembly and utilizing said determination to evaluate the integrity of the assembly.

10. The method of claim 9, providing the assembly manifest with the hash of the manifest of at least one referenced assembly of the list of referenced assemblies comprises providing the assembly manifest with a hash of each referenced assembly of the list of referenced assemblies.

11. The method of claim 9, further comprising providing identity information in the assembly manifest.

12. The method of claim 11, the identity information comprising publisher information and version information.

13. The method of claim 9, further comprising providing a hash of the contents of the assembly at the end of the assembly.

14. The method of claim 9, further comprising determining if the contents of the at least one referenced assembly have been modified by determining an actual hash of the contents of the at least one referenced assembly of the list of referenced assemblies and comparing the actual hash with a hash of the contents of the at least one referenced assembly of the list of referenced assemblies residing in the assembly manifest.

15. The method of claim 14, further comprising determining if the publisher of the at least one referenced assembly is trustworthy if the at least one referenced assembly has been modified.

16. The method of claim 15, determining if the publisher of the at least one referenced assembly is trustworthy if the at least one referenced assembly has been modified comprises checking version information and publisher name information residing in the manifest of the at least one referenced assembly.

17. A computer readable medium having at least one computer executable component employable by an application program at runtime comprising:
   an assembly including an assembly manifest that contains a list of at least one referenced assembly that the assembly references, a first hash of a manifest of the at least one referenced assembly, a list of modules that make up the assembly and a hash of the contents of at least one module of the list of modules, the hash of the contents of the at least one module is utilized to control which versions of the modules are employed in connection with the assembly at runtime;
   a component that compares the first hash to a second hash produced at runtime and utilizes the determination as to whether the at least one referenced assembly is a same version as the at least one referenced assembly utilized at build time of the assembly to evaluate the integrity of the assembly.

18. The computer readable medium of claim 17, the assembly manifest including identity information and version information.

19. The computer readable medium of claim 17, the assembly being a dynamically linked library.

20. A computer readable medium having at least one computer executable component employable by an application program at runtime comprising:
   an assembly including an assembly manifest that contains a list of at least one referenced assembly that the assembly references and a hash of a manifest of the at least one referenced assembly;
   a component that compares the hash to a second hash produced at runtime and utilizes the determination as to whether the at least one referenced assembly is a same version as the at least one referenced assembly utilized at build time of the assembly to evaluate the integrity of the assembly.

21. A computer implemented system for facilitating integrity of assemblies employable by application programs at runtime, the system comprising:
   a first component that provides an assembly manifest for an assembly, the assembly manifest having a list of modules making up the assembly and a list of at least one referenced assembly that the assembly references;

a second component that provides the assembly manifest with a hash of at least one module of the list of modules and a hash of a manifest of the at least one referenced assembly; and a third component that compares the hash of the at least one module with a hash of the at least one module generated at runtime to identify changes in the content of the at least one module; and utilizes said identification to evaluate the integrity of the assembly.

22. The system of claim 21, further comprising a third component adapted to compare the hash of said at least one module with an actual hash value of the at least one module.

23. The system of claim 22, the assembly manifest including identity and version information and the third component adapted to determine if the assembly should be executed based on a review of the originator and version information, if the hash of the at least one module in the assembly manifest and the actual hash value of the at least one module are different.

24. The system of claim 21, further comprising a binding component adapted to provide binding policy information for determining a version of an assembly that an application program will run if another assembly having the same name resides on the system.

25. A computer implemented system for facilitating integrity of assemblies employable by application programs at runtime, the system comprising:

a first component that provides an assembly manifest for an assembly, the assembly manifest having at least one referenced assembly, the at least one referenced assembly comprising a manifest;

a second component that provides the assembly manifest with a hash of the manifest of the at least one referenced assembly; and a third component that compares the hash of the at least one referenced assembly in the assembly manifest with an actual hash value of the at least one referenced assembly to identify version changes and utilizes said identification to evaluate the integrity of the assembly.

26. The system of claim 25, further comprising a binding component adapted to provide the third component with binding policy information.

27. A computer implemented system for facilitating integrity of an assembly employable by application programs at runtime, the system comprising:

means for relating an assembly manifest having a list of at least one related assembly to an assembly, the at least one related assembly comprising a manifest;

means for providing the assembly manifest with a hash of the manifest of the at least one related assembly; and means for evaluating integrity of the assembly by comparing the hash value with a hash value of a second related assembly computed at runtime.

28. The system of claim 27, the at least one related assembly being a module.

29. The system of claim 27, the at least one related assembly being a referenced assembly.

30. The system of claim 27, further comprising means for comparing a hash value of the at least one related assembly in the assembly manifest to an actual hash value of the at least one related assembly.

31. The system of claim 27, further comprising means for establishing a binding policy.

32. The system of claim 27, at least one of the assembly and the at least one related assembly being a dynamically linked library.

\* \* \* \* \*